UNITED STATES PATENT OFFICE.

ORANGE WILLIAMS, OF MILWAUKEE, WISCONSIN, ASSIGNOR OF TWO-NINTHS TO CHARLES P. FOSTER, OF SAME PLACE.

PRESERVING COMPOUND.

SPECIFICATION forming part of Letters Patent No. 435,911, dated September 2, 1890.

Application filed June 26, 1890. Serial No. 356,890. (No specimens.)

*To all whom it may concern:*

Be it known that I, ORANGE WILLIAMS, of Milwaukee, in the county of Milwaukee and in the State of Wisconsin, have invented certain new and useful Improvements in Antiseptic Compounds and Germicides; and I do hereby declare that the following is a full, clear, and exact description thereof.

My invention relates to antiseptic compounds and germicides, and will be fully set forth hereinafter, and subsequently claimed.

In carrying my invention into effect I take half a pound of coffee-berries slightly browned and grind the same to a fine powder and mix it with two ounces of finely-ground cinchona-bark and one pound of finely-ground cinnamon. This I term "Mixture A." I then take eight pounds of flowers of sulphur, to which I add two ounces of sugar and one pound of potassium nitrate, both in a finely-pulverized condition, and mix these ingredients thoroughly together in a cold dry state, forming what I term "Mixture B." I next take the two mixtures and intimately unite them by stirring in a cold dry state, and the compound is ready for use in the form of a powder, in which condition it may be employed for preserving food and preserving and embalming dead bodies by subjecting the article to the fumes of the powder when undergoing combustion in an air-tight vehicle or receptacle.

For use as a germicide I preferably employ a solution formed by saturating water with the gases evolved by combustion, as before described, in an air-tight vessel, employing about ten gallons of water to one pound of the powder, about twelve hours being usually required for the proper impregnation of the water.

Having thus described my invention, what I claim as new, and desire to secure by Letters Patent, is—

1. An antiseptic compound or germicide comprising ground coffee-berries, ground cinchona-bark, and ground cinnamon, mixed with flowers of sulphur and pulverized sugar and potassium nitrate, substantially as set forth.

2. An antiseptic compound or germicide consisting of water impregnated with the gases evolved from the combustion of a mixture of ground coffee-berries, ground cinchona-bark, ground cinnamon, flowers of sulphur, pulverized sugar, and pulverized potassium nitrate, substantially as set forth.

In testimony that I claim the foregoing, I have hereunto set my hand at Milwaukee, in the county of Milwaukee and State of Wisconsin, in the presence of two witnesses.

ORANGE WILLIAMS.

Witnesses:
 H. G. UNDERWOOD,
 LAWSON SCOTT.